United States Patent [19]

Douglas

[11] Patent Number: 4,461,556

[45] Date of Patent: Jul. 24, 1984

[54] FILM PROCESSING APPARATUS FOR SELF-PROCESSING FILM UNIT WITH A FOLDED APPLICATOR

[75] Inventor: Lawrence M. Douglas, South Easton, Mass.

[73] Assignee: Polaroid Corporation, Cambridge, Mass.

[21] Appl. No.: 445,416

[22] Filed: Nov. 30, 1982

[51] Int. Cl.³ .................. G03B 17/52; G03D 9/00
[52] U.S. Cl. ............................. 354/303; 354/86; 354/318
[58] Field of Search ............... 354/83, 84, 85, 86, 354/87, 88, 301, 303, 304, 305, 318

[56] References Cited

U.S. PATENT DOCUMENTS

3,183,809  5/1965  Nerwin ........................ 354/87
3,521,541  7/1970  Schmidt et al. ............... 354/85
4,052,728  10/1977  Hendry et al. ............... 354/86
4,401,381  8/1983  Cocco .......................... 354/86

Primary Examiner—A. A. Mathews
Attorney, Agent, or Firm—John S. Vale

[57] ABSTRACT

A processing apparatus, for use with a self-processing film unit of the type including a sheet-like photosensitive film component and a low viscosity processing liquid applicator, is configured to apply a longitudinally directed compression force to the film unit causing a flat leader tab forming section thereon to fold and form a protruding leader tab. The tab is fed into a pair of rollers on the apparatus which advance the film unit therebetween to progressively apply a force, preferably having both a tension component and compression component, to the leader tab and then to following portions of the film unit for manipulating an initially folded and releasably sealed enclosure section of the applicator to bring a processing liquid soaked pad therein into liquid yielding contact with an outer surface of the film component.

23 Claims, 12 Drawing Figures

FILM PROCESSING APPARATUS FOR SELF-PROCESSING FILM UNIT WITH A FOLDED APPLICATOR

BACKGROUND OF THE INVENTION

The present invention relates to the field of photography and, more specifically, to a processing apparatus for manipulating a self-processing film unit to effect wetting of a given surface area thereof with a low viscosity processing liquid.

Commonly assigned co-pending application U.S. application Ser. No. 445,417, now U.S. Pat. No. 4,429,037, filed on even date herewith discloses and claims a longitudinally extending self-processing film unit comprising a sheet-like photosensitive film component and a liquid applicator secured thereto.

The film component includes one or more photosensitive layers and has an outer surface with a given area thereof that is configured to be wetted with a low viscosity processing liquid, following exposure of the one or more photosensitive layers, to initiate processing of the film component.

The liquid applicator attached to the film component includes an initially folded and releasably sealed enclosure section having therein means yieldably holding a substantially uniformly distributed supply of a low viscosity processing liquid. The liquid holding means may include, for example, an absorbent pad soaked with the processing liquid. The liquid applicator also includes a leader tab forming section disposed between one end of the film component and the enclosure section, and being movable, in response to a longitudinally directed compressive force applied to the film unit, from an initial substantially flat position to a position wherein it forms an outwardly extending leader tab. Another component part of the applicator is a ground section for mechanically grounding a predetermined portion of the enclosure section so that, in response to the progressive application of a tension force to the leader tab and then to following portions of the film unit, the folded enclosure section is unsealed and extended to bring it into overlying relation to the film component outer surface with the liquid holding means in liquid yielding contact with the given area to effect wetting thereof.

To effectively use this type of self-processing film unit, there is a need for a simply constructed processing apparatus which, following exposure of the film component, is operative to first apply the longitudinally directed compressive force to form the protruding leader tab and then to progressively apply the tension force to unseal the enclosure section and move it to its extended position to bring the liquid holding pad into liquid yielding contact with the given area of the film component outer surface.

Commonly assigned co-pending application, U.S. application Ser. No. 436,189, filed on Oct. 22, 1982, discloses a self-processing film unit comprising a sheet-like photosensitive film component and a low viscosity applicator secured to one end thereof. The applicator includes a flat folded and releasably sealed enclosure section having a liquid soaked pad therein. This type of film unit structure does not include a leader tab forming section. Therefore, the processing apparatus with which it is adapted to be used must grip one of the enclosure wall sections and urge it away from the opposite wall section to unseal the enclosure section and then further manipulate it to move it to its extended position.

Such a processing apparatus is disclosed and claimed in commonly assigned co-pending application U.S. application Ser. No. 436,078, filed on Oct. 22, 1982, now U.S. Pat. No. 4,401,381.

In the illustrated embodiment, the processing apparatus includes a movable pick mechanism for engaging one wall of the enclosure section and urging it away from the opposite wall to break the releasable seals about enclosure periphery. The pick also moves the unsealed applicator rearwardly to a partially deployed position over the sheet-like film component. The pick then reverses direction and urges the film unit into the bite of pair of pressure-applying rollers which serve to urge the liquid soaked pad into good contact with the given area of the outer surface of the film component as the film unit is advanced therebetween.

Such a processing apparatus tends to be rather mechanically complex and expensive to manufacure. Also, this type of processing apparatus is not adapted to handle a self-processing film unit of the type having a leader tab forming section.

Therefore, it is an object of the present invention to provide a low-cost, and simply constructed processing apparatus for use with a self-processing film unit of the type including a sheet-like film component and a liquid applicator which includes a leader tab forming section for facilitating movement of the applicator enclosure section from its initial folded and releasably sealed position to its extended position.

It is yet another object of the present invention to provide such an apparatus which is operable first to manipulate the film unit so as to form the protruding leader tab and then to utilize the leader tab in subsequent manipulation steps to effect unsealing of the enclosure section and its movement to its extended position.

Other objects of the invention will, in part, be obvious and will, in part, appear hereinafter.

SUMMARY OF THE INVENTION

The present invention provides a simply constructed processing apparatus for use with a self-processing film unit of the type including a sheet-like photosensitive film component and a liquid applicator.

The film component includes one or more photosensitive layers and has an outer surface with a given area thereof that is configured to be wetted with a low viscosity processing liquid, following exposure of the one or more photosensitive layers, to initiate processing of the film component.

The liquid applicator is attached to the film component and includes an initially folded and releasably sealed enclosure section having therein means yieldably holding a substantially uniformly distributed supply of a low viscosity processing liquid, a leader tab forming section that is movable from an initial position to a position wherein it forms a leader tab in response to applying a first force to the film unit; and a ground section for mechanically grounding a predetermined portion of the enclosure section so that in response to progressively applying a second force to the leader tab and then to following portions of the the film unit, the folded enclosure section is unsealed and extended to bring it into overlying relation to the film component outer surface with the liquid holding means in liquid yielding contact with the given area to effect wetting thereof.

Broadly speaking, the processing apparatus comprises: means for supporting such a film unit; means for applying such a first force to the film unit for effecting formation of the leader tab; and means for progressively applying such a second force to the leader tab and then to the following portions of the film unit to effect unsealing of the enclosure section and its movement to the extended position to bring the liquid holding means into liquid yielding contact with the given area of the film component.

More specifically, the means for applying the first force is configured to apply a longitudinally directed compressive force to the film unit which causes the leader tab forming section to buckle or fold into a Z-folded configuration to form a protruding leader tab. The means for applying the second force is configured to apply a second force having both a tension component and a compression component. Preferably, the second force applying means includes a pair of pressure-applying rollers, at least one of which is configured to be rotatably driven to advance the film unit therebetween, for applying both tension and compressive forces to the film unit.

The tension component of the second force is utilized to effect the unsealing of the folded enclosure section and its movement to the extended position, and the compression component of the second force is utilized to urge the liquid holding means into good liquid yielding contact with the film component outer surface.

In the illustrated embodiment the means for applying the compressive force include a stop surface in the apparatus housing and means, such as a pick engageable with the trailing end of the film unit, for urging the film unit against the stop to thereby apply a longitudinally directed compressive force which results in.the movement of the leader tab forming section from its initial position to the position where it forms the protruding leader tab. In a preferred embodiment, the leader tab is automatically fed into the bite of the rollers during the leader tab forming operation.

BRIEF DESCRIPTION OF THE DRAWINGS

For a fuller understanding of the nature and objects of the present invention, reference may be had to the following detailed description taken in connection with the accompanying drawings wherein.

DESCRIPTION OF THE PREFERRED EMBODIMENT

Figures 1, 2:
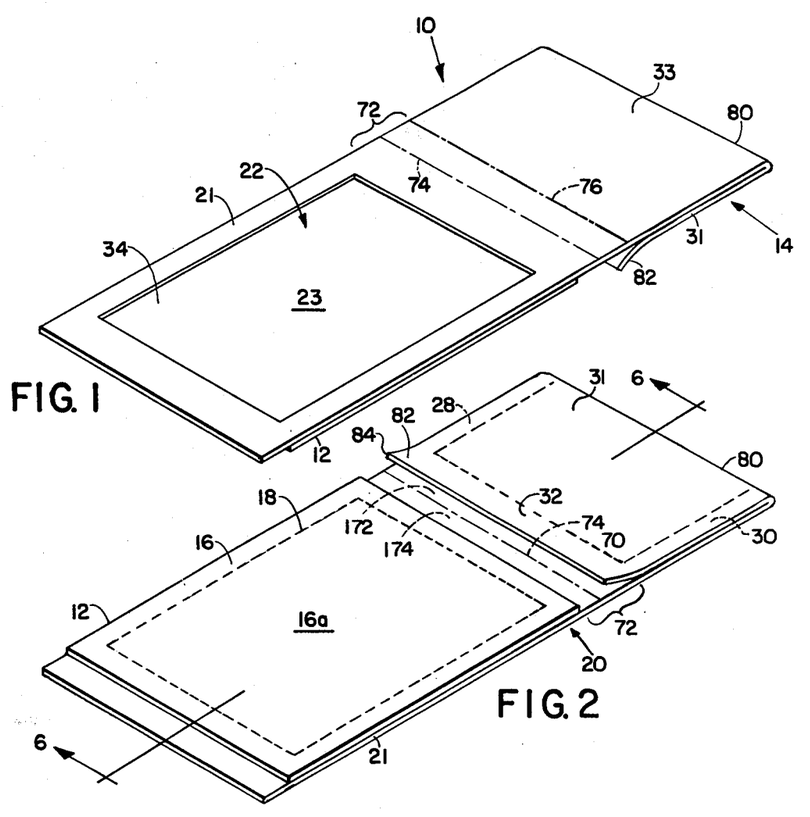
FIG. 1 is a perspective view of the viewing side of a film unit, configured for use with the processing apparatus embodying the present invention, showing the liquid applicator in its folded and releasably sealed initial position.
FIG. 2 is a perspective view showing the opposite or exposure side of the film unit in FIG. 1 before it is processed.

The present invention provides a low-cost, later-to-be-described processing apparatus 90 for processing a processing (or self-developing) film unit 10, shown in perspective in FIGS. 1 through 5, comprising a sheet-like photosensitive film component 12 and a processing liquid applicator 14 secured to component 12 and holding therein a supply of a low viscosity liquid processing composition. Film unit 10 is shown in FIGS. 1 and 2 in its "as manufactured" pre-processing configuration with applicator 14 located in its initial flat folded and releasably sealed position wherein it is disposed in substantially coplanar relation with film component 12 adjacent a leading end thereof. As will become apparent later, FIG. 2 shows the top or exposure side of the illustrated film unit 10, and FIG. 1 shows its bottom or viewing side.

Broadly speaking, film component 12 includes a base or support sheet having one or more layers coated thereon including one or more photosensitive layers that are adapted to be exposed to actinic radiation to form a latent image therein. Following exposure, the liquid processing composition applicator 14 is adapted to be unfolded and brought into contact with a designated outer surface of film component 12, such as the top surface 16 shown in FIG. 2, to wet a predetermined given area thereof, such as the rectangular area 16a bounded by dotted lines 18, that generally coincides with a delineated image-forming area to initiate processing of film component 12 which may include the step of developing the latent image in the exposed photosensitive layer or layers.

The applicator 14 is formed, in part, by a liquid and air impervious carrier web or sheet 20 secured to component 12 outside of the bounds of the given area 16a. In the illustrated embodiment, a mask section 21 of sheet 20 having a die cut rectangular opening 22 therein (see FIGS. 1 and 5) is secured to the outer peripheral margins of the viewing or bottom side of film component 12 by an suitable means, such as adhesive bonding, so that mask section 21 serves as a boardering frame about the film unit's image area 23 which is viewable through opening 22 In an alternative embodiment, the mask portion may be eliminated and one end of sheet 20 may be simply secured to the leading end portion of the viewing side of film component 12.

Figure 3:
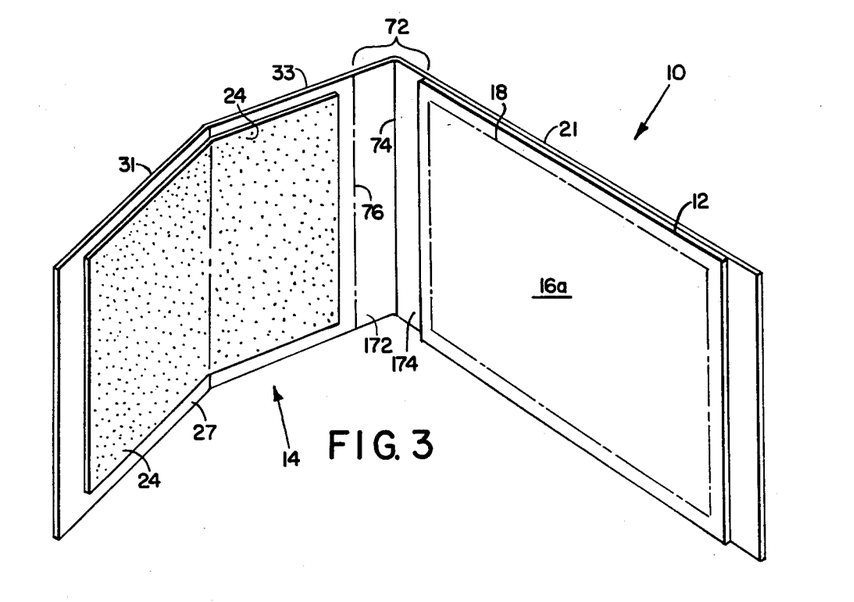
FIG. 3 is a perspective view of the film unit showing how the applicator is unfolded during processing operation.
Figure 6:
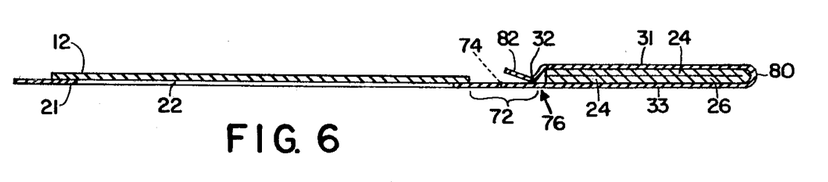
FIG. 6 is a longitudinal cross section of the film unit taken along lines 6—6 of FIG. 2.

The applicator 14 also includes, on one surface of sheet 20, means for yieldably holding a substantially uniformly distributed supply of a low viscosity processing liquid sufficient to wet the given area 16a, for example, as shown in FIGS. 3 and 6, a rectangular absorbent or pourous pad 24, or the like, soaked with a low viscosity processing liquid 26 and disposed on an interior surface 27 of sheet 20 in a central portion of the applicator.

Applicator 14 is initially provided on component 12, during manufacture, in the folded substantially flat configuration shown in FIGS. 1, 2, and 6 wherein sheet 20 is folded back on itself and is releasably sealed along two longitudinally extending marginal portions 28 and 30 and a transverse or laterally extending rear portion 32 to form a liquid and air impervious enclosure about the liquid holding means or pad 24 which also assumes a folded configuration on the interior surface 27 of sheet 20. When so folded, sheet 20 defines opposed enclosure top and bottom wall sections 31 and 33.

Figure 4:
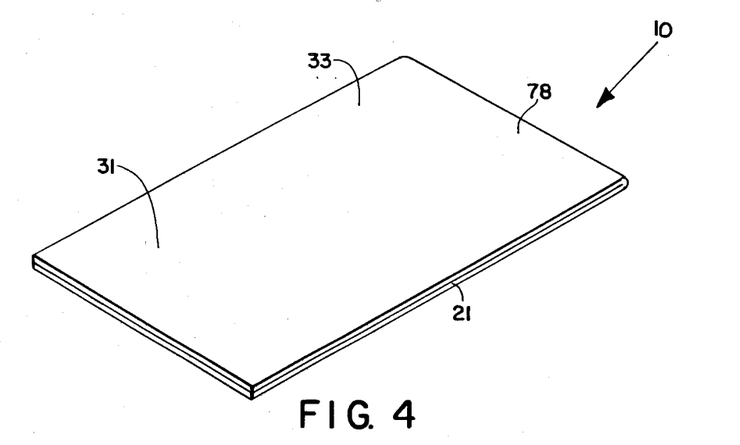
FIG. 4 is a perspective view of the back side of the film unit showing the applicator in its fully extended position overlying the film component.
Figure 5:
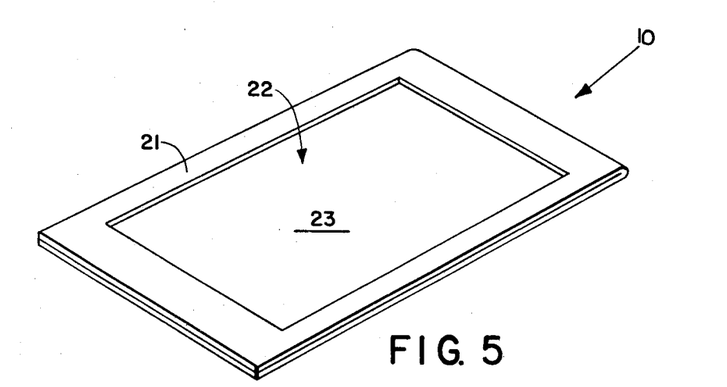
FIG. 5 is a perspective view showing the viewing side of the film unit after the applicator has been moved to its extended position.

After exposure of the photosensitive layer or layers of film component 12 which may be accomplished by directing image-forming light onto top surface 16, or onto bottom outer surface 34 opposite surface 16 if the film component is constructed to be exposed from that side, the applicator 14 is moved from the folded sealed position to an unsealed extended position by urging or peeling wall sections 31 and 33 apart to break the seals 28, 30, and 32 and extending sheet 20 rearwardly, as shown in FIG. 3, so that it overlies the outer surface 16 as shown in FIG. 4 with the liquid holding means or pad 24 in liquid yielding contact with the given area 16a to effect wetting thereof Depending on the type of film construction, a variety of which will be discussed later, the extended applicator may be stripped away from surface 16 following a suitable imbibition period, or it may be left in place to form a permanently attached component, such as a protective cover sheet, of the processed film unit 10.

Film unit 10 offers many advantages over prior art self-developing film units that employ a jelly-like high viscosity liquid and other prior art self-processing film systems, described earlier, that utilize a low viscosity processing liquid.

Because the low viscosity processing liquid is substantially uniformly distributed by the soaked pad 24, the need to provide precision film and camera components and mechanisms to uniformly distribute the liquid with respect to the surface to be wetted is eliminated, thereby providing substantial cost savings. Also, by using a low viscosity liquid that has flow characteristics similar to water, transfer of the processing composition from the liquid holding means on the extended applicator 14 to the surface area 16a is readily accomplished by capillary action. The only requirement for such transfer to take place is to establish good contact between the facing surface of pad 24 and the surface area 16a which may be accomplished by advancing the film unit 10, with applicator 14 extended, between a pair of pressure applying rollers to press these two elements together as will be described later in detail. Advantageously, the rollers may be of relatively inexpensive construction because, in light of the predistribution of the liquid, they do not have to perform a liquid spreading function which would require expensive rollers manufactured to high tolerances to achieve the desired uniformity.

Another advantage of film unit 10 is that it does not require any trap structure at the trailing end to receive and store excess liquid as do film units that employ a high viscosity liquid which is discharged from a pod and progressively distributed between a pair of film layers from the leading to trailing end of the film unit.

Perhaps a more important advantage lies in the fact that film unit 10 combines in one simply constructed structure all of the necessary elements for processing the exposed film component 12 with a low viscosity liquid. That is, film unit 10 includes a self-contained supply of a low viscosity processing liquid which is protected from evaporation and environmental contamination by the liquid and air impervious enclosure formed by the folded and sealed sheet 20. Advantageously, the sheet 20 performs multiple functions. Because it is secured during manufacture to film component 12, in a predetermined position with respect to surface area 16a, sheet 20 serves as means for precisely aligning and registering the liquid holding means or pad 24 with respect to the surface area 16a thereby eliminating the need for processing mechanism structure to perform the registration function. When sheet 20 is extended, it serves to support and guide the attached soaked pad 24 to its operative processing position overlying film component 12. Also, in addition to its earlier noted function of providing a liquid and air impervious enclosure for pad 24 when it is folded and releasably sealed, sheet 20 may serve as a protective cover sheet on one side of film component 12 if the extended applicator is to be left in place after completion of processing.

Another advantage of film unit 10 is that the applicator 14 is mounted on film component 12 outside of the boundaries of the predetermined image forming area 16a so as not to interfere with or block the film exposure process. By mounting applicator 14 on one end of film component 12, either of the outer surfaces 16 or 34 are available as exposure surfaces. The choice of whether to expose through the top or the bottom of the film component of course would depend on the design of the particular type of film utilized.

The types of film components 12 that may be combined with the applicator 14 to form a film unit 10 envisioned by this invention include, but are not restricted to, conventional,black and white negative materials; and self-developing or instant diffusion transfer films including integral or peel apart type black and white and color reflection print and transparency films which include, in addition to the photosensitive layer or layers, an image receiving layer on which silver complexes or image dyes are deposited by diffusion, as a function of developing the exposed photosensitive layers.

The term "processing" in the context of this disclosure simply means wetting the surface area 16a with a low viscosity processing liquid to ultimately produce a desired photographic processing result. The particular processing that actually takes place is determined by the chemical properties of the liquid and the layer or layers of film component 12. The process resulting from wetting surface area 16a may be complex, for example, a development and diffusion transfer process associated with color self-developing films, or the process may be quite simple and limited to a single step such as developing. The processing liquid 26 may simply be water which is used to activate processing chemicals that are predisposed in selected layers of film component 12. Again, the present invention is intended to provide a film unit which includes a photosensitive film component and a self-contained supply of low viscosity processing liquid which is attached to the film component 12 in the form of an applicator 14 which is initially provided in a folded configuration to protectively enclose the liquid and is movable to an extended processing position to bring the liquid into wetting contact with a predetermined area of the film component 12 to initiate "processing," as broadly defined above, of the film component 12.

Figure 7:
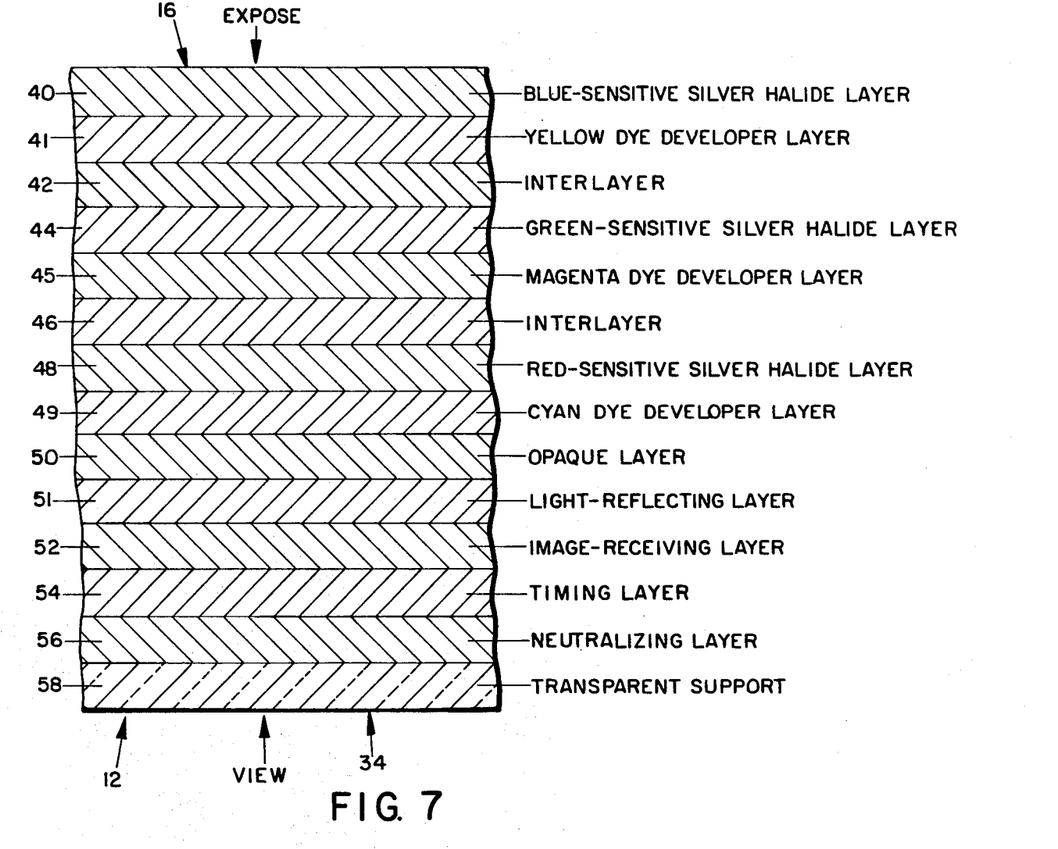
FIG. 7 is a diagrammatic cross-sectional representation of the various layers in the photosensitive film component.

For a representative example of one type of photosensitive film component or laminate 12 that may be used in combination with the disclosed liquid applicator 14 to form a film unit 10 embodying the present invention, reference is made to FIG. 7 showing, in diagrammatic form, a color diffusion transfer process film unit component 12.

The illustrated photosensitive film component or laminate 12 is adapted to be exposed in a camera to image forming actinic radiation incident upon one side of component 12 as indicated by the arrow in FIG. 7 designated "expose." Subsequent to development and diffusion transfer of image dyes, a positive image is formed, in a dyeable image receiving layer viewable through the opposite side of component 12 as indicated by the arrow designated "view."

Starting on the exposure side, the layers comprising component 12 include, in sequence, a blue sensitive silver halide emulsion layer 40; a yellow dye developer layer 41; interlayer 42; a green sensitive silver halide emulsion layer 44; a magenta dye developer layer 43; interlayer 46; a red sensitive silver halide emulsion layer 48; a cyan dye developer layer 49; an opaque layer 50; a light-reflecting layer 51; a transparent, dyeable image-receiving layer 52; a transparent spacer or timing layer 54; a transparent neutralizing or acid layer 56; and a transparent support 58 on which the above-noted layers are coated in the reverse sequence of their identification herein, and through which the positive image is viewed.

Following exposure of the three photosensitive emulsion layers 40, 44 and 48 by directing image-forming actinic radiation onto the outer surface area 16a of layer 40, the liquid applicator 14 is moved from its folded position to its extended position to bring the pad 24 soaked with the low viscosity liquid processing composition 26 into engagement with surface area 16a to effect wetting thereof with liquid 26.

The low viscosity processing liquid 26 includes as a primary ingredient thereof an aqueous solution of an alkaline material, for example, potassium hydroxide, or the like, in a concentration to provide the appropriate pH for the process.

The permeation of liquid 26 initiates development of the exposed photosensitive emulsions. The associated dye developers are immobilized or precipitated in developed areas as a consequence of such development. In unexposed and partially exposed areas of the photosensitive emulsions, the unreacted dye developers provide imagewise distributions of diffusible dye developer. At least part of these imagewise distributions of diffusible dye developer is transferred, by diffusion, through the opaque layer 50 and the light-reflecting layer 51 to the image receiving layer 52, to provide a positive color image of the developed image. After a predetermined time, liquid 26 permeates through the spacer or timing layer 54, and it reacts with the neutralizing acid layer 56 which is effective to cause reduction in the pH of the liquid to a predetermined pH. This reduction in pH level serves to stabilize the image.

The light-reflecting layer 51 is preferably white, e.g., titanium dioxide, to provide a suitable background against which the transferred dyes in the transparent image receiving layer 52 are viewed. The light-reflecting layer 51 in combination with opaque layer 50, e.g., of carbon black, prevent exposure or fogging of the photosensitive emulsions by light incident upon the viewing side of film component 12. If the extended applicator 14 also includes at least one opaque layer, it serves to block unwanted exposure from the opposite side once it is in place thereby allowing completion of the film processing cycle to take place in an actinic environment, such as outside of the camera. That is, if the applicator 14 is opaque and is extended over outer surface 16 before the film unit exits the camera, the extended applicator 14 in combination with the light blocking properties of light-reflecting layer 50 and opaque layer 51 prevent further exposure of the emulsions 40, 44 and 48 thus allowing the film unit 10 to be removed from the camera before the processing cycle has been completed.

While the illustrated diffusion transfer film component 12 of film unit 10 shown in FIG. 7 is configured for exposure through one side and viewing through the opposite side, it should be understood that the present invention is not restricted to the use of such a film component 12. That is, other types of diffusion transfer film components 12 having different arrangements of layers may be combined with applicator 14 to provide a film unit 10 embodying the present invention. For example, the film component 12 may be configured so that it is both exposed and viewed through one side and processed by wetting that same one side or the opposite side Alternatively, the film component may be configured to be peeled apart after processing at a designate layer interface to reveal the diffusion transfer image. Film components 12 may be provided wherein opaque layer 51 is omitted. In this case the processing must take place in a light excluding environment to prevent fogging Also, the film component 12 may be configured so that the processing liquid is applied to an outer surface through which the diffusion image is viewed subsequent to processing. In this case, sheet 20 is removed to uncover the image.

As noted earlier, it is within the scope of the present invention to utilize any suitable type of photosensitive film component 12 in combination with applicator 14 to form a self-processing film unit 10. Diffusion transfer film components 12 may be integral or peel-apart types; black and white or color; reflection print or transparencies. Also, the film.component 12 may be a conventional negative sheet.

The construction of photosensitive materials like film component 12 is well known and described in the literature. Since the particular photographic process embodied in such film components forms no part of the present invention, such processes and film components need not be described in detail herein. Nevertheless, U.S. Pat. Nos. 3,594,164 and 3,888,669 and British Pat. No. 1,330,524 may be noted as illustrative descriptions of photosensitive materials of the general type illustrated in FIG. 7 and employing a variety of image dye-forming materials, dye developers being preferred in the noted U.S. patents.

As noted above, this invention may be utilized with a variety of photographic imaging systems to give black and white or color images. Thus, a black and white negative image may be obtained, without the formation of a positive transfer image, by using a photosensitive element and a processing composition such as that described in U.S. Pat. No. 3,721,562. Black and white silver transfer images may be obtained, for example, by the use of a layer arrangement such as shown in U.S. Pat. No. 3,705,804.

The image dye-providing materials which may be employed in such processes generally may be characterized as either (1) initially soluble or diffusible in the processing composition but which are selectively rendered non-diffusible in an imagewise pattern as a function of development; or (2) initially insoluble or non-diffusible in the processing composition but which are selectively rendered diffusible or provide a diffusible product in an imagewise pattern as a function of development. These materials may be complete dyes or dye intermediates, e.g., color couplers. The requisite differential in mobility or solubility may, for example, be obtained by a chemical action such as a redox reaction or a coupling reaction.

As examples of initially soluble or diffusible materials and their application in color diffusion transfer, mention may be made of those disclosed, for example, in U.S. Pat. Nos. 2,968,554; 2,983,606; 3,087,817; 3,345,163; and 3,443,943. As examples of initially non-diffusible materials and their use in color transfer systems, mention may be made of the materials and systems disclosed in U.S. Pat. Nos 3,185,567, 3,230,082; 3,443,939; 3,443,940; 3,227,550; 3,227,552; 3,719,489; and 4,076,529.

It is also to be undersood that the silver halide emulsions may be negative-working or positive-working (e.g., internal latent image emulsions), depending upon the particular image dye-providing substances employed and whether a positive or negative color transfer image is desired.

As noted earlier, sheet 20 of applicator 14 in its folded and releasably sealed configuration of FIGS. 1, 2 and 6 forms a liquid and air impervious enclosure about pad 24 to prevent evaporation of the liquid 26 therein and to protect the liquid from contamination by elements in the environmental atmosphere from the time sheet 20 is sealed at manufacture until it is unsealed at the time of use.

Figure 8:
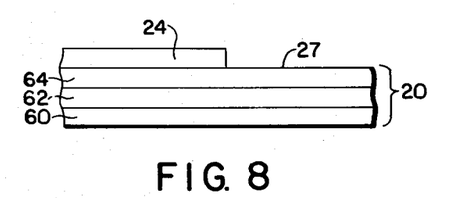
FIG. 8 is a diagrammatic cross-sectional representation of the various layers forming the impervious sheet utilized in the applicator.

Typical material suitable for use as applicator sheet 20 preferably are alkali resistant composite materials such as the type shown in FIG. 8 comprising a multi-layer laminate formed by an outer sheet or layer 60; a middle sheet or layer 62, and an inner sheet or layer 64 having the surface 27 on which the liquid holding means or pad 24 is carried.

The outer sheet or layer 60 is a thin, flexible, relatively inexpensive, tough material which may be a plastic but which is preferably an opaque paper such as kraft paper. The middle layer or sheet 62 is a thin, impervious sheet material such as metal foil, for example, a lead or very soft temper aluminum foil, approximately 0.001 inch in thickness and attached to outer sheet 60 by any simple means known to the art such as adhesive bonding or the like. The inner layer 64 is preferably a thermoplastic resin, inert to the liquid processing composition 26 and its vapors, such as polyvinyl chloride which may be adhered to the metal foil layer 62 by coating and/or laminating procedures well known in the art.

For a more detailed description of laminate materials suitable for use as sheet 20 along with examples of alternative materials that may be used in the individual layers thereof, reference may be had to commonly assigned U.S. Pat. Nos. 3,056,491; 3,056,492; 3,833,381; and 4,303,750 all of which are incorporated by reference herein.

The liquid holding pad 24 disposed on surface 27 of layer 64 of sheet 20 is an absorbent and/or porous material which resists deterioration when in prolonged contact with the liquid 26. Such absorbent and/or porous materials include woven and non-woven sheet materials, natural and synthetic sponge materials, fibrous or cellulosic containing materials such as absorbent papers (e.g. blotters), natural or synthetic fiber textiles, porous plastic sheets and foils, plastic or other synthetic foams, and the like.

The liquid holding means or pad 24 may be formed as a separate sheet which is adhered, in its dry state before introduction of liquid 26 therein, to the thermoplastic layer 64 by adhesive or thermocompression bonding or the like. Alternatively, pad 24 may be provided initially in a form that allows it to be adherently coated, sprayed, or otherwise deposited on layer 64 so that the liquid holding means is formed in situ on sheet 20.

One representative example of a material that has been successfully employed as a liquid holding pad 24 is a non-woven sheet of polypropylene fiber, 0.004 inch thick, manufactured by the Kendall Corporation under the trade designation Webril non-woven sheet.

As best shown in FIGS. 1, 2, and 6, the folded enclosure section of applicator 14 is spaced from the adjacent leading end 70 of film component 12 by an integral flat leader tab forming and connector section 72 of sheet 20 extending from the leading end of the mask section 21 to the transverse laterally extending applicator rear seal 32 where it merges with the trailing end of the enclosure bottom wall section 33.

Connector section 72 has two laterally extending fold lines 74 and 76 disposed in substantially parallel relation to the leading end 70 of film component 12 and the rear seal 32. These fold lines may be formed by any suitable method, such as creasing or scoring sheet 20. Fold line 74 is located at about the midpoint of the connector section 72, while fold line 76 is adjacent the rear seal 32. As will become apparent later, following exposure, the film unit 10 will be subjected to a longitudinally directed compression force which will cause the connector section 72 to buckle or fold downwardly, as viewed in FIGS. 2 and 6, and form a protruding leader tab 78 (see FIG. 10) having its leading edge at fold line 74. The leader tab 78 serves as a film unit component that is gripped or engaged by means (such as a pair or rollers) on a film processing apparatus for applying a second force (this time, a force having both a tension and compression component) to the film unit for unsealing the applicator and effecting its movement from the folded position of FIGS. 1, 2, and 6 to its extended position shown in FIGS. 4 and 5.

As noted earlier, that portion of sheet 20 extending forwardly of connector section 72 is folded back on itself, at applicator leading edge 80, to form the facing wall sections 31 and 33 of the releasably sealed enclosure section surrounding the soaked pad 24.

The lateral marginal seals 28 and 30 and the longer transverse rear seal 32 may be formed by applying heat and/or pressure to the corrresponding superposed portions of the folded sheet 20 to effect adherence of the facing surfaces of the thermoplastic inner layer 64 outboard of the central area thereof on which pad 24 is disposed.

The liquid 26 may be applied to pad 24 before any of the seals are made with sheet 20 and pad 24 thereon either in a planar extended position or in the folded over configuration. Alternatively, sheet 20 may be folded and partially sealed before application of the liquid 26 to pad 24. In this instance, any one or two of the seals are made before the liquid is injected onto pad 24 through one or more of the remaining open sides which are then sealed following introduction of the liquid 26. The preferred sequence for wetting pad 24 and making the releasable seals 28, 30 and 32 will, of course, depend on the choice of design of high volum production machinery for manufacturing the applicator 14 in an efficient and cost-effective manner.

In the illustrated embodiment, cover sheet 20 is light opaque and the extended applicator 14 is intended to serve as a light blocking cover sheet for the exposure side of film component 12 so that the film unit 10 may be advanced directly into an actinic radiation environment following deployment of the applicator 14 to its extended processing position. Because the film component 12 provides a viewable image on the opposite side from the surface to be wetted, the extended applicator 14 may be adhered to film component 12 and left in place permanently following completion of processing. In this instance, the extended applicator 14 also serves a a long-term protective cover sheet or barrier layer that protects the exposure side of film component 12 from atmospheric contamination or degradation, for example, by inhibiting oxidation.

Even if applicator 14 is used with a film component 12 requiring the extended applicator 14 to be stripped away from outer surface 16 after the completion of processing, either simply to remove pad 24 from engagement with surface area 16a or to unblock a viewing surface in those film components that are structured so that the desired image is viewed through the surface to be wetted, it may be preferable to at least temporarily secure the periphery of the extended sheet 20 outboard of the pad 24 to the corresponding facing portions of the surface 16 to inhibit light and/or liquid leakage at this interface during processing.

In such an application, the peripheral area of inner surface 27, outboard of pad 24, may be coated with a reusable adhesive material that releasably bonds to itself when sheet 20 is folded to form the strippably releasable marginal seals 28, 30, and 32 and retains its adhesive properties so that it can be used again as adhesive to adhere these peripheral portions to the facing portions of surface 16 when applicator 14 is extended and pressed into contact therewith.

Alternatively, the peripheral portions of surface 27 may be initially coated with a dry contact type of adhesive which does not adhere to itself but will adhere to a complementary dry contact adhesive that is precoated on the facing peripheral portions of surface 16. In this instance, after sheet 20 is folded, the marginal seals 28, 30 and 32 may be formed, by the application of heat and/or pressure, as thin linear seal lines disposed on the outboard edges of pad 24 but inboard of the dry adhesive coating so that the seals are made between facing linear portions of the thermoplastic resin layer 64. Thus, in such an embodiment, the initial seals are made by thermocompression bonding and, after sheet 20 is extended and pressed into place, the peripheral or secondary seals are made by adhesive bonding.

In another alternative embodiment, the peripheral portion of surface 27 may be provided without any additional adhesive coating thereon and may be heat and/or pressure sealed as noted above; and the corresponding facing peripheral area of the film component outer surface 16 may be precoated with a dry adhesive that is activated when contacted by the processing fluid 26 from pad 24. In this case, pad 24 would be made a little wider and longer to come in contact with at least the edge portions of the dry adhesive thereby activating the adhesive to form the bond when the applicator 14 is extended and brought into contact with surface 16.

As best shown in FIGS. 2 and 6, the top wall section 31 of the enclosure extends rearwardly of the rear seal 32 to define a mechanical ground section or tab 82 which terminates in a trailing edge 84. The ground tab 82 extends out over the forward portion of the connector section 72 so that the trailing edge 84 is approximately in alignment with the fold line 74. As will become apparent later, after film unit 10 is subjected to the compressive force to form leader tab 78, the ground tab 82 will bear against the leading end of the film component 12 so that when the tension force is applied to the leader tab 78, ground tab 82 provides a mechanical "ground" thereby restraining motion of top wall 31 relative to bottom wall 33 which is urged away from the top wall section 31 by the force on leader tab 78 to peel apart the applicator seal.

One method for forming the applicator structure is as follows: A supply roll of impervious sheet 20 is fed through an adhesive applicator to coat the interior surface 27 of layer 64 with a film component bonding adhesive in the mask section 21 and to coat the peripheral sections of the enclosure-forming section and the lateral edge portions of the connector section 72 with a dry reusable contact adhesive. The web is then fed through a machine which forms the fold lines 74 and 76 by creasing or scoring sheet 20 in the connector section 72 and also die cuts the viewing aperture 22 in the mask section 21. Next, the supply roll is fed to a machine which secures the liquid holding pad 24 to that portion of surface 27 in the enclosure forming area. The individual applicator assemblies are severed from the roll, the pad 24 is wet with the low viscosity processing liquid 26, and sheet 20 is folded at 80 and sealed along the open edges to form the hermetic enclosure about the wet pad 24. Later, the individual applicator structures are fed through a machine which places a film component 12 face down on the mask section where it is secured by the adhesive bond.

The film unit 10 described above is disclosed and claimed in commonly assigned co-pending appliction U.S. Ser. No. 445,417, now U.S. Pat. No. 4,429,037, filed on even date herewith, and is adapted to be manipulated by a simply constructed processing apparatus 90 embodying the present invention. In the illustrated embodiment, shown in FIGS. 9 through 12, processing apparatus 90 includes a housing 92 having a chamber 94 therein for receiving and supporting a cassette 96 holding a supply of film units 10 (only one of which is shown) arranged in stacked relation therein.

Figure 9:
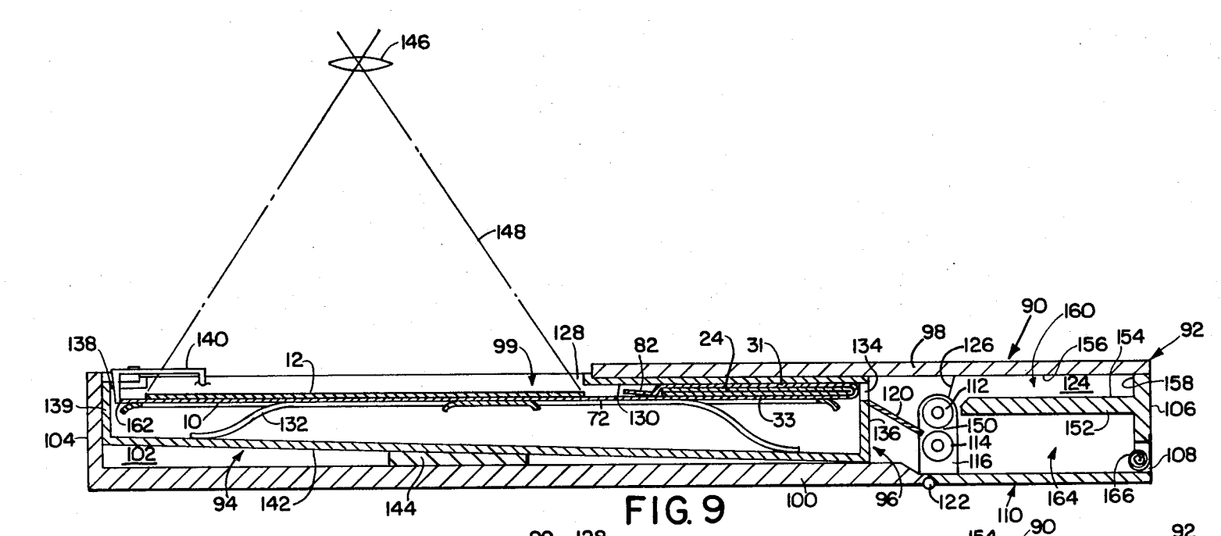
FIG. 9 is a longitudinal cross section of the processing apparatus, embodying the present invention, for processing the film unit with the film unit shown in a cassette at a film exposure position within the apparatus.

Housing 92 is a thin elongated structure having a parallelepiped shape defined by a top wall 98 having a rectangular exposure aperture 99 therein, and oppositely spaced bottom wall 100, and an intermediate peripheral section including a pair of side walls 102 (only the far side wall appearing in the drawings) a trailing end wall 104, and an oppositely spaced leading end wall 106 having a laterally extending film exit slot 108 at the bottom end thereof adjacent bottom wall 100.

Located forwardly of receiving chamber 94 is a roller housing section 110 of housing 92 having a pair of juxtaposed pressure-applying rollers 112 and 114 rotatably mounted on a pair of laterally spaced upstanding roller mounting brackets 116 secured to bottom wall 100. Also mounted on brackets 116 are a pair of inclined rearwardly and upwardly extending leading tab guide ramps 120 which serve to guide the leader tab 78 into the bite of rollers 112 and 114 as will become apparent later.

In a preferred embodiment, a major portion of the rolling housing section 110 is pivotly mounted on housing 92 to provide access for inserting a cassette 96 into, and withdrawing it from, the receiving chamber 94. In the illustrated embodiment, the bottom wall 100 is hinged at 122. The forward section of bottom wall 100 mounting the rollers thereon, the leading end wall 106 attached to the forward section of bottom wall 100 but not to the top wall 98, and forward sections 124 of the side walls 102, to the right of the parting line 126, which are secured to the forward section of bottom wall 100 and to the lateral ends of the leading end wall 106 form a single structural unit that is movable between the closed and releasably latched operative positions shown in FIGS. 9 through 12 locating the rollers and leader tab guide ramps in operative relation to the forward end of the cassette 96, and an open position wherein roller housing section 110 is pivoted downwardly in a clockwise direction about hinge 122 to space the rollers and ramp structure from the open leading end of chamber 94 to provide access thereto.

In the cassette 96 is a tapered box-like structure (somewhat taller at the leading end to accommodate the stack of relatively thick applicators 14) which has a rectangular exposure aperture 128 in its top or forward wall 130. Aperture 128 is substantially coextensive with exposure aperture 99 in housing top wall 98 and is adapted to be aligned in registration therewith when cassette 96 is located at its fully inserted operative position within receiving chamber 94. A spring platen 132 in cassette 96 behind the stack urges the film units upwardly to press the forwardmost film unit 10 in the stack against the interior surface of forward wall 130 whereby the film component 12 of the forwardmost film unit is accurately located at an exposure position in registration with exposure aperture 128. A laterally extending film withdrawal slot 134 is provided in the upper end of cassette leading end wall 136 in alignment with the leading end 80 of the applicator of the forwardmost film unit 10. Cassette 96 also has a longitudinally extending pick access slot 138 in the forward wall 130 extending forwardly along one side thereof from cassette trailing end wall 139 to a point adjacent the forward end of exposure aperture 128. As will become apparent later, access slot 138 accommodates a pick member 140 which is movably mounted on apparatus 90 and is used to advance the forwardmost film unit through film withdrawal slot 134, following exposure, to initiate film processing operations.

In FIGS. 9 through 12, cassette 96 is shown at its fully inserted operative position in chamber 94 with the cassette exposure aperture 128 in aligned registration with exposure aperture 99. The correct longitudinal position of the cassette is set by advancing it rearwardly into chamber 94 until the cassette trailing end wall 139 is in bearing relation with the interior surface of housing trailing end wall 104.

The correct lateral location is set by chamber side wall structures (not shown) which engage the opposite side walls 102 of the cassette. As cassette 96 is inserted into chamber 94, its bottom wall 142 engages and is supported by a support wedge 144 on housing bottom wall 100 which urges cassette 96 upwardly so that the cassette forward wall 130 is urged into bearing contact with the under side of housing top wall 98. In this manner, cassette 96 is position vertically in chamber 94 so that the film component 12 of the forwardmost film unit 10 in the cassette is located at a film exposure plane.

FIG. 9 diagrammatically shows an objective lens 146, forming part of a camera apparatus, projecting a cone of image-bearing light 148 throught the aligned exposure apertures 99 and 128 and on to the outer surface 16 of the forwardmost film component 12 to expose the photosensitive layers therein. Those skilled in the art will appreciate that such a camera would also include means, such as a bellows, for excluding ambient light from the optical path between the lens and film plane, and an exposure control system, including a shutter, for regulating the amount of image-bearing light that impinges upon surface 16.

The processing apparatus 90, embodying the present invention, may be built into such a camera apparatus to provide a self-contained self-developing camera. Alternatively, apparatus 90 may be provided in the form of a processing camera back that is configured to be attached to a conventional view camera or the like. Also, apparatus may be configured to be optically aligned, but not connected to, a photographic imaging apparatus, such as an enlarger, to effect exposure of the film unit 10. Or, apparatus 90 may be provided without aperture 99 and function strictly as a processing apparatus for processing film units that have been exposed before loading into apparatus 90.

When roller housing section 110 is located in its closed position, the nip or bite 150 between the rollers 112 and 114 is located forwardly of and below the cassette film withdrawal slot 134, and the inclined guide ramps 122 slope downwardly from the lower edge of slot 134 toward the bite line for guiding the leader tab 78 thereinto.

The top surface of the upper roller 112 is at about the same height as the lower edge of slot 134. Extending rearwardly from the interior of leading end wall 106 to a point just forwardly of the exit side of the upper roller 112 is a plate-like applicator support member 152 having an upper horizontal support surface 154 that is in substantially the same plane as the lower edge of slot 134 and the top surface of upper roller 112. The support surface 154 and the coplanar top surface of upper roller 112 cooperate with the oppositely spaced horizontal inner surface 156 of housing top wall 98 and a vertical stop surface 158 on the interior side of leading end wall 106 to define portions of an upper applicator receiving chamber 160 in the roller housing section 110.

Figure 10:
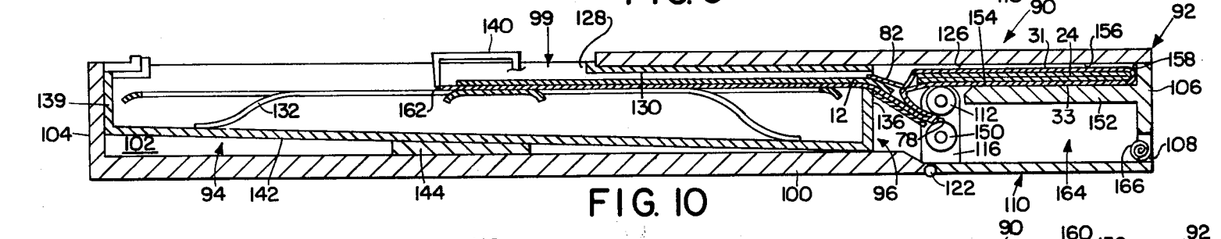
FIG. 10 is similar in some respects to FIG. 9 but shows the film unit having been advanced to a leader forming position by a pick mechanism in the apparatus.
Figure 11:
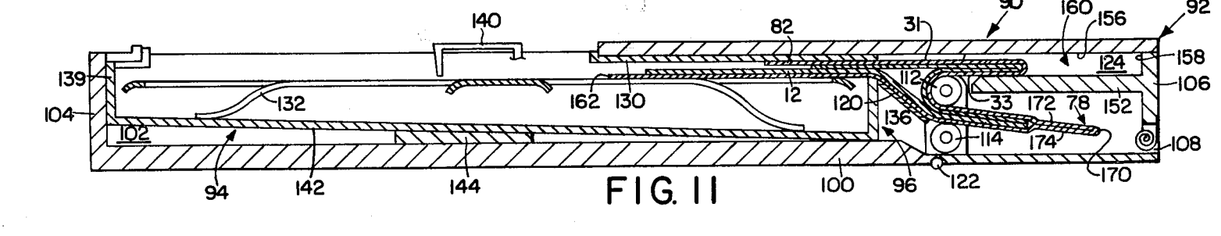
FIG. 11 is similar in some respects to FIG. 10 but shows the film unit after its leading end portion has been advanced through the pressure-applying rollers.
Figure 12:
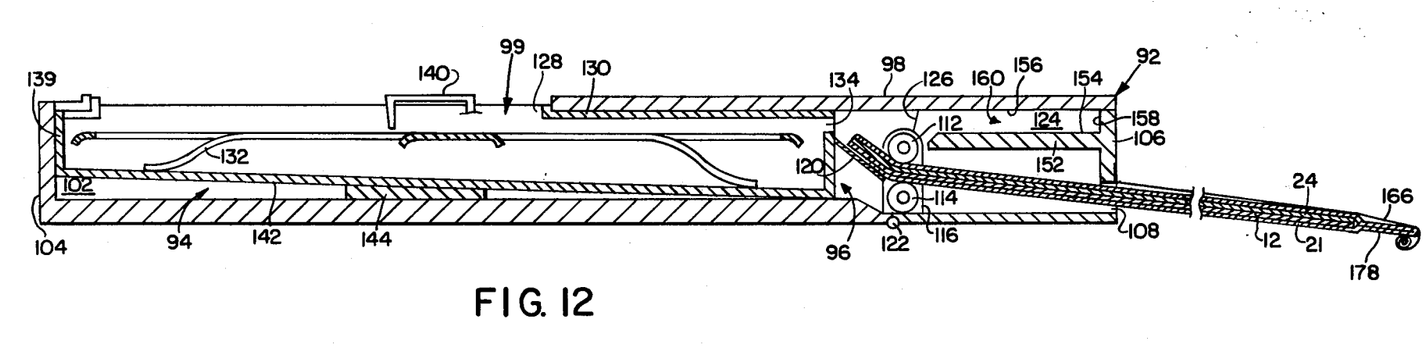
FIG. 12 shows the affects of continued advancement of the film unit through the pressure-applying rollers.

The pick member 140 is mounted for linear reciprocating motion within housing 92 between its rearwardmost or retracted position shown in FIG. 9 where it engages the trailing edge 162 of the forwardmost film unit 10 located at the exposure position, and its forwardmost position shown in FIGS. 10, 11, and 12. During an initial portion of its movement from the rearwardmost position, the pick 140 pushes on the trailing end of film unit 10 and begins advancing the film unit through slot 134. The film unit follows a straight line path passing over the top of upper roller 112 and enters the chamber 160. This forward motion of the entire film unit continues until the leading end 80 of the applicator 14 abuts up against the stop surface 158 at the forwardmost end of chamber 160. With further forward motion of the applicator 14 so inhibited, continued forward movement of pick 140 pushing on the trailing end of film unit 10 induces a longitudinally directed compression force within the film unit that causes the leader forming connector section 72 to buckle and form the protruding leader tab 78 which, as it is formed, follows the guide ramps 120 downwardly so that the leading end of leader tab 78, at fold line 74, is inserted into the bite 150 of the pressure-applying rollers as shown in FIG. 10.

In a preferred embodiment, at least one of the rollers is adapted to be rotatably driven to effect advancement of the film unit 10 therebetween and along a film exit path passing through a lower chamber 164 in roller housing 110 (below chamber 160) and out through the film exit slot 108 at the lower end of leading end wall 106. In the illustrated embodiment, exit slot 108 is light shielded by a coiled "frog's tongue" type of extensible light shield 166 which serves as part of a light sealing system for housing 92 that protects the photosensitive film component 12 from being fogged by stray light before the opaque sheet 20 is fully extended thereover.

In a preferred embodiment, processing apparatus 90 includes a combination pick and roller drive system of the type commonly employed in commercially available self-developing cameras manufactured by Polaroid Corporation, Cambridge, Mass. In such a system, a small, high-speed, D.C. electrical motor, powered by flat battery in film cassette 96 (not shown), drives a gear train and pick drive cam assembly that imparts rotary motion to at least one of the pressure-applying rollers and forward linear drive to the pick 140. Most commonly, the pick 140 is automatically pulled back to its rearwardmost position by a return spring following its forward drive to advance the film unit 10 to the position shown in FIG. 10. By way of illustration, a roller and pick drive system of this type is disclosed in commonly assigned U.S. Pat. No. 4,052,728 which is incorporated by reference herein.

As best shown in FIG. 10, in response to the compressive force applied to film unit 10 by the forwardly moving pick 140, the leading tab forming connector section 72 buckles and assumes a Z-folded configuration to form the protruding leader tab 78 which extends downwardly from the common plane of the folded applicator 14 and the film component 12 with its folded back leading end 170 (formed at fold line 74) projecting forwardly toward the bite 150 of the rollers. Stated another way, the connector section 72 may be thought of as comprising adjacent forward and rear panels 172 and 174. Forward panel 172 is that portion of connector section 72 between fold lines 74 and 76, while adjacent rear panel 174 extends rearwardly from fold line 74 to the leading end of mask portion 21 underlying the leading edge 70 of film component 12. In response to the longitudinally directed compressive force, the leading end of the forward panel 172 pivots in a counterclockwise direction with respect to fold line 76 while, at the same time, its lower end pivots in a counterclockwise direction with respect to fold line 74. As a result, forward panel 172 is folded back over rear panel 174 to form the leader tab 78 having its folded leading end 170 at fold line 74.

As the leader tab 78 is formed in this manner, the mask portion 21 of sheet 20 carrying film component 12 thereon moves forwardly relative to the folded applicator 14 which is inhibited from moving forwardly in chamber 160 by the stop surface 158. As a result of such movement, the leading end of the film component 12 slides under the free trailing end of the applicator ground tab 82.

The ground tab 82 may be thought of as an integral extension of enclosure top wall 31 extending rearwardly from the rear seal 32. Following formation of leader tab 78, and the insertion of its leading end 170 into the bite 150 of the rollers, the rear seal 32 is situated in a gap between the cassette leading end wall 36 and the entrance side of the rollers, and the trailing end of ground tab 82 is in overlying engagement with the leading end of the film component 12 on mask 21.

The laminate structure forming sheet 20, while somewhat flexible, does exhibit a degree of stiffness that allows the top wall 31 and its ground tab extension 82 to be thought of as a beam structure. The trailing end of this "beam" behind rear seal 32 (ground tab 82) is mechanically grounded by the supportive engagement of the leading end of the film component 12 which is in turn mechanically grounded to the bottom wall of the cassette by the spring platen 32 and the intervening mask portion 21. The forward portion of the "beam", ahead of rear seal 32, is grounded by the support of the upper roller 112 and platen 152 applied to top wall section 31 through the folded applicator structure. In this context, the term "mechanically grounded" means that the beam structure is supported at both ends so as to resist downward vertical displacement. Now, when the rollers 112 and 114 are driven in a direction to effect advancement of the leader tab 78 therebetween into chamber 164, the rollers exert a tension or pulling force on tab 78 which try to urge the trailing end of enclosure bottom wall and the rear seal 32 downwardly toward the roller bite 150. But, the grounded "beam" structure bridging the gap between the cassette and rollers inhibits such downward movement of the entire seal 32, thereby providing an oppositely directed reaction force which induces a tensile stress in the rear seal 32. The rear seal 32 and the marginal seals 28 and 30 are relatively low strength seals which are intentionally designed to yield or pull apart when subjected to the amount of tensile stress induced therein by the rollers pulling on leader tab 78.

Once the rear seal 32 parts as the result of such stress, the rollers 112 and 114 continue to advance the film unit 10 therebetween as shown in FIG. 11 so that the tension or pulling force is applied progressively to the film unit, i.e., first to tab 78 and then to following portions of the film unit. The bottom enclosure wall section 33 travels over the top surface of upper roller 112, around its entrance side outer surface and into the bite 150 thereby progressively turning the portion of wall section 33 wrapped on the upper roller through 180 degrees to bring to bring the corresponding portion of the liquid-soaked pad 24 into face-to-face contact with the outer surface 16 of the simultaneously advancing film component 12 on mask section 21. The rollers 112 and 114 also exert a compressive pressure on the superposed pad and film component as they are advanced therethrough to urge the liquid-soaked pad 24 into good, liquid-yielding contact with the outer surface 16 to effect wetting of surface area 16a.

In response to such film advancement, the tensile stress is applied progressively to the marginal seals 28 and 30 causing them to peel apart as successive portions of lower wall section 33 wrap around upper roller 112.

The upper wall section 31 continues to bridge the gap and serve as the mechanical ground for inducing the peel-apart tensile stress in the marginal seals. As the lower wall section 33 is fed around the upper roller 112, it pulls the remaining sealed section of applicator 14 rearwardly out of the upper chamber 160. Such motion causes the top wall section 31 to simultaneously move rearwardly therewith through the cassette withdrawal slot 134 and over the outer surface 16 of the film component 12 toward the applicator's fully extended position. As best shown in FIG. 10, when the film unit 10 is advanced by the pick 140 to fully insert applicator 14 in chamber 160, the trailing end of ground tab 84 does not fully emerge from withdrawal slot 134 but rather the trailing end remains within the confines of the cassette to facilitate reinsertion of the top wall section 31 as shown in FIG. 11.

By the time the fold line end 80 of applicator 14 is pulled back across the top surface of upper roller 112, the marginal seals 28 and 30 have been completely pulled apart thereby effecting movement of the applicator from its folded position to a position wherein it is almost fully extended. The film unit 10 continues its advance through the rollers to bring the trailing end portion of pad 24 (on wall section 31) into liquid-yielding contact with the facing section of film component 12.

The film unit 10 is advanced through the lower chamber 164 and out of housing 92 through the film exit slot 108, as shown in FIG. 12. The leading end of the film unit engages the coiled light shield 166 in exit slot 108 as it passes therethrough and moves it forwardly to an outwardly projecting extended position. When the leading end of the film unit becomes disengaged from the coil, the shield retracts in a self-coiling fashion to a position adjacent the leading end wall 106. As the trailing end of film unit 10 is pulled out of opening 108, the shield 166 returns to its light-blocking position in opening 108.

If the extended cover sheet 20 is to be used as a permanently attached cover sheet on the exposure side of film component 12, then the passage between the pressure-applying rollers also serves to seal the extended cover sheet in place. If the rear seal 32 and marginal seals 28 and 30 are thermocompression seals, then a dry contact adhesive will be provided outboard thereof for mating with a dry contact adhesive about the periphery of the given area 16a of the film unit for sealing the extended sheet 20 thereto. As noted earlier, similar dry contact adhesive may be provided on the lateral edges of connector section 72 to seal the leader tab panels 172 and 174 together when the leader tab 78 is formed. Alternatively, the rear seal 32 and marginal seals 28 and 30 may be formed with a reusable adhesive which sticks to the periphery of the film component outer surface 16 when sheet 20 is extended and pressed into engagement therewith by the rollers 112 and 114.

Since certain changes may be made in the above-described processing apparatus without departing from the spirit and scope of the invention herein involved, it is intended that all matter contained in the above description or shown in the accompanying drawings shall be interpreted as illustrative and not in a limiting sense.

What is claimed is:

1. Processing apparatus for use with a self-processing film unit of the type including a sheet-like film component including one or more photosensitive layers and having an outer surface with a given area thereof that is configured to be wetted with a low viscosity processing liquid, following exposure of the one or more photosensitive layers, to initiate processing of the film component, and a liquid applicator attached to the film component and including an initially folded and releasably sealed enclosure section having therein means yieldably holding a substantially uniformly distributed supply of a low viscosity processing liquid, a leader tab forming section that is movable from an initial position to a position wherein it forms a leader tab in response to applying a first force to the film unit, and a ground section for mechanically grounding a predetermined portion of the enclosure section so that, in response to progressively applying a second force to the leader tab and then to following portions of the film unit, the folded enclosure section is unsealed and extended to bring it into overlying relation to the film component outer surface with the liquid holding means in liquid yielding contact with the given area to effect wetting thereof, said processing apparatus comprising:
   means for supporting such a film unit;
   means for applying such a first force to said film unit for effecting formation of the leader tab; and
   means for progressively applying such a second force to the leader tab and then to following portions of the film unit to effect unsealing of the enclosure section and its movement to the extended position to bring the liquid holding means into liquid yielding contact with the given area to effect wetting thereof.

2. The processing apparatus of claim 1 wherein said means for applying said first force is configured to apply a compressive force to the film unit to effect formation of the leader tab.

3. The processing apparatus of claim 1 wherein said means for applying said second force is configured to apply a second force having a tension component.

4. The processing apparatus of claim 3 wherein said means for applying said second force is configured to apply a second force which has a compression component in addition to said tension component.

5. The processing apparatus of claim 1 wherein said means for applying said second force includes a pair of pressure-applying rollers, at least one of which is configured to be rotatably driven to advance the film unit therebetween, for progressively applying a second force having both a tension and compression component.

6. The processing apparatus of claim 5 wherein said tension component of said second force is utilized to effect the unsealing of the folded enclosure section and its movement to the extended position and the compression component of said second force is utilized to urge the liquid holding means into good liquid yielding contact with the film component outer surface.

7. The processing apparatus of claim 1 wherein said means for applying said first force includes a stop surface and means for urging the film unit against said stop surface thereby applying a compressive force to the film unit which results in movement of said leader tab forming section from its initial position to the position where it forms the leader tab.

8. The processing apparatus of claim 7 wherein said means for urging the film unit against said stop surface includes a movable pick engageable with one end of the film unit for advancing the film unit so that its opposite end is brought into abutment with said stop surface.

9. The processing apparatus of claim 8 wherein said means for applying said second force includes a pair of pressure-applying rollers, at least one of which is configured to be rotatably driven to advance the film unit, leader tab first, between said pair of rollers.

10. The processing apparatus of claim 9 further including means for guiding the leader tab into operative engagement with said pressure-applying rollers.

11. Processing apparatus for use with a longitudinally extending self-processing film unit of the type including a sheet-like film component including one or more photosensitive layers and having an outer surface with a given area thereof that is configured to be wetted with a low viscosity processing liquid, following exposure of the one or more photosensitive layers, to initiate processing of the film component, and a liquid applicator attached to the film component and including an initially folded and releasably sealed enclosure section having therein means yieldably holding a substantially uniformly distributed supply of a low viscosity processing liquid, a leader tab forming section disposed between one end of said film component and said enclosure section and being movable, in response to a longitudinally directed compressive force applied to the film unit, from an initial substantially flat position to a position wherein it forms an outwardly extending leader tab, and a ground section for mechanically grounding a predetermined portion of the enclosure section so that, in response to the progressive application of a tension force to the leader tab and then to following portions of the film unit, the folded enclosure section is unsealed and extended to bring it into overlying relation to the film component outer surface with the liquid holding means in liquid yielding contact with the given area to effect wetting thereof, said processing apparatus comprising:

a housing;
means for supporting such a film unit at an initial position within said housing;
means for engaging the film unit at said initial position and for applying such a longitudinally directed compressive force thereto for moving said leader tab forming section from its initial position to the position wherein it forms the outwardly extending leader tab; and
means for receiving the leader tab and for progressively applying such a tension force to the leader tab and then to following portions of the film unit to effect the unsealing of the folded enclosure section and its movement to the extended position.

12. The processing apparatus of claim 11 wherein said means for progressively applying said tension force is also configured to simultaneously apply a compressive force to said film unit for urging said liquid holding means into good liquid yielding contact with the film component outer surface.

13. The processing apparatus of claim 12 wherein said means for engaging the film unit at said initial position is configured to advance the film unit from the initial position to a leader forming position before applying said compressive force thereto to effect formation of the leader tab.

14. The processing apparatus of claim 13 wherein said means for receiving said leader tab is located relative to said leader forming position so that said leader tab is automatically fed into receiving engagement with said receiving means when said leader tab is formed.

15. The processing apparatus of claim 14 wherein said means for receiving the leader tab and for progressively applying said tension and compressive forces includes a pair of pressure-applying rollers, at least one of which is adapted to be rotatably driven to advance the film unit therebetween.

16. The processing apparatus of claim 15 further including means for guiding the leader tab, as it is formed, into the bite of said pressure-applying rollers.

17. The processing apparatus of claim 11 wherein said longitudinally directed compressive force applying means includes a stop surface on said housing against which one end of the film unit is adapted to be brought into bearing relation, and means for pushing on the opposite end of the film unit while the one end bears against said stop to generate said compressive force for moving said leader tab forming section to its said leader tab forming position.

18. The processing apparatus of claim 11 wherein said initial position at which the film unit is supported by said support means is an exposure position, and said housing includes an exposure aperture therein through which imageforming light is transmitted to expose the film component at said initial position.

19. The processing apparatus of claim 11 wherein said means for applying the longitudinally directed compression force includes a stop surface and a pick for urging the film unit against said stop surface to provide said longitudinally directed compressive force, and said means for progressively applying said tension force includes a pair of rollers, and wherein said pair of rollers is located intermediate said support means and said stop surface.

20. The processing apparatus of claim 19 wherein said pick is configured to advance the film unit from said initial position to a leader tab forming position before applying said compressive force thereto, in conjunction with said stop surface, for effecting formation of the leader tab.

21. The processing apparatus of claim 20 wherein said pick advances at least a portion of the film unit past said rollers to locate the film unit in said leader tab forming position.

22. The processing apparatus of claim 21 wherein said pick advances the film unit so that at least a major portion of said folded enclosure section extends beyond said rollers with an end of said enclosure section in abutment with said stop surface when the film unit is at said leader tab forming position.

23. The processing apparatus of claim 22 wherein said pair of rollers includes an upper roller and a lower roller, and said pick is configured to advance the film unit so that at least a portion of said folded enclosure section passes over said upper roller when the film unit is moved to said leader tab forming position.

* * * * *